Patented Nov. 29, 1949

2,489,532

UNITED STATES PATENT OFFICE 2,489,532

ALKENYL NAPHTHYL ETHERS AS INSECTICIDES

Theodore W. Kerr, Jr., Seymour, and Walter D. Harris, Naugatuck, Conn., assignors to United States Rubber Company, New York, N. Y., a corporation of New Jersey No Drawing. Application October 8, 1945, Serial No. 621,179

6 Claims. (Cl. 167—32)

This invention relates to improvements in insecticides. The term "insecticide" is considered to include larvaecides, arachnicides, and insect repellents or insectifuges, and is to be construed in accordance with the Insecticide Act of 1910, section 6.

We have found that alkenyl naphthyl ethers are effective insecticides. The insecticides may be the 1-naphthyl ethers

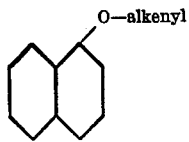

or the 2-naphthyl ethers

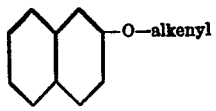

Examples of alkenyl naphthyl ethers are allyl 2-naphthyl ether, allyl 1-naphthyl ether, methallyl 2-naphthyl ether, methallyl 1-naphthyl ether. For economic reasons the alkenyl 2-naphthyl ethers are preferred. The preparation of these materials is well known in the literature.

The alkenyl naphthyl ethers may be applied to loci to be protected against insects in undiluted form, or as dusts when admixed with or adsorbed on powdered solid inert carriers, such as clay or talc, or as liquids or sprays when in a liquid carrier, as in solution in a suitable solvent, or dispersed in a suitable non-solvent medium, for example, water. In protecting plants (the term including plant parts) which are subject to attack by insects, the alkenyl naphthyl ethers are preferably applied as aqueous emulsions containing a dispersing agent. The alkenyl naphthyl ethers may be used admixed with carriers that are active of themselves, for example, other insecticides, fungicides or bactericides.

The following examples describing tests on various alkenyl naphthyl ethers are given to illustrate the invention:

Example I

Pinto bean leaves were sprayed with one percent aqueous emulsions of various alkenyl naphthyl ethers, the emulsions containing 0.1% of "Emulfor EL," a commercial surface-active dispersing agent which is a polyethylene glycol condensate, believed to be the reaction product of ethylene oxide and castor oil. The bean leaves were infested with forty Mexican bean beetles and were placed in separate covered petri dishes. After 48 hours observation disclosed mortalities of the beetles on the leaves treated with the various alkenyl naphthyl ethers as shown in the following table. In untreated leaves there was no mortality of the beetles.

| Chemical | Percent mortality |
|---|---|
| Allyl 2-naphthyl ether | 100.0 |
| Allyl 1-naphthyl ether | 97.5 |
| Methallyl 2-naphthyl ether | 100.0 |
| Methallyl 1-naphthyl ether | 100.0 |

Example II

Leaves of the broad bean (*Vicia faba*) infested with pea aphids were sprayed with one percent aqueous emulsions of various alkenyl naphthyl ethers, the emulsions containing 0.1% of "Emulfor EL." Observations were made after 24 hours to disclose the kill of aphids. The percent mortality and the number of pea aphids on the leaves treated with the various alkenyl naphthyl ethers is shown in the following table. In untreated (check) leaves infested with 165 aphids, the mortality was 1.8%.

| Chemical | Number of Aphids | Per Cent Mortality |
|---|---|---|
| Allyl 2-naphthyl ether | 166 | 100.0 |
| Allyl 1-naphthyl ether | 190 | 98.9 |
| Methallyl 2-naphthyl ether | 182 | 95.1 |
| Methallyl 1-naphthyl ether | 165 | 90.9 |

Example III

Pinto bean leaves infested with red spider mites were sprayed with one percent emulsions of various alkenyl naphthyl ethers, the emulsions containing 0.1% of "Emulfor EL." Observations were made after 24 hours to disclose the kill of mites. The percent mortality and the number of mites on the leaves treated with the various alkenyl naphthyl ethers is shown in the table below. In untreated (check) leaves infested with 143 red spider mites, the mortality was 2.1% after 24 hours.

| Chemical | Number of Aphids | Per Cent Mortality |
|---|---|---|
| Allyl 2-naphthyl ether | 163 | 100.0 |
| Allyl 1-naphthyl ether | 201 | 100.0 |
| Methallyl 2-naphthyl ether | 200 | 97.5 |
| Methallyl 1-naphthyl ether | 174 | 82.8 |

This application is a continuation-in-part of application Serial No. 600,409, filed June 19, 1945, now abandoned.

Having thus described our invention, what we claim and desire to protect by Letters Patent is:

1. An insecticidal composition comprising an alkenyl naphthyl ether of the group consisting of allyl and methallyl naphthyl ethers, and a surface-active dispersing agent.

2. An insecticidal composition comprising an aqueous emulsion of an alkenyl naphthyl ether of the group consisting of allyl and methallyl naphthyl ethers, said aqueous emulsion containing a dispersing agent.

3. An insecticidal composition comprising allyl 2-naphthyl ether as an active ingredient, and a surface-active dispersing agent.

4. An insecticidal composition comprising an aqueous emulsion of allyl 2-naphthyl ether, said aqueous emulsion containing a dispersing agent.

5. An insecticidal composition comprising methallyl 2-naphthyl ether as an active ingredient, and a surface-active dispersing agent.

6. An insecticidal composition comprising an aqueous emulsion of methallyl 2-naphthyl ether, said aqueous emulsion containing a dispersing agent.

THEODORE W. KERR, Jr.
WALTER D. HARRIS.

REFERENCES CITED

The following references are of record in the file of this patent:

UNITED STATES PATENTS

| Number | Name | Date |
|---|---|---|
| 2,159,025 | Hester | May 23, 1939 |

OTHER REFERENCES

Dictionary of Organic Compounds, by Heilbron, 1938 edition, vol. 3, page 18. (Copy in Pat. Off. Library.)